INVENTOR:
Walter Osborne
ATTORNEY.

Patented Sept. 10, 1946

2,407,440

UNITED STATES PATENT OFFICE 2,407,440

PISTON FOR INTERNAL-COMBUSTION ENGINES

Walter Osborne, Glendale, Calif.

Application January 7, 1944, Serial No. 517,447

12 Claims. (Cl. 309—4)

This invention relates to a piston for internal combustion engines.

Among the objects of the invention are: to provide for the reduction of piston drag, thereby increasing the power output of the engine; to keep the piston running straight at all times; to cause the wear upon the piston rings to be equally distributed thereby causing them to direct more accurately the reciprocatory movement of the piston; to maintain the motor at a cooler temperature during operation; to cause the motor to run more freely and quietly; and to improve the oil circulation through the motor.

Other objects of the invention pertain to the provision of a piston structure that will make it easier to start the engine; to provide for reducing piston vibration while the engine is running; to provide a novel, more efficient grooved or annularly recessed portion of the piston for collecting the carbon and to keep it from obstructing the movement of the piston and piston rings; and to provide an improved arrangement of vacuum relief apertures in the grooved portion of the piston.

A more specific object is to provide the piston with improved oil-containing recesses and grooves which are so positioned and contoured as to accelerate the movement of the oil across the surfaces to be lubricated when the engine is in operation.

The invention further relates to a new article of manufacture consisting of a piston structure suitable for being used in engine cylinders already on the market.

The invention further relates to a piston structure which may be provided by machining operations performed upon pistons already in use, thus at small expense, adapting pistons to function in the more advantageous manner hereinafter set forth.

Still other objects, advantages and features of invention will hereinafter appear.

Referring to the accompanying drawing, which illustrates what is at present deemed to be a preferred embodiment of the invention, which is in successful operation, Fig. 1 is partly sectional and partly elevational view of the piston.

Figure 1:
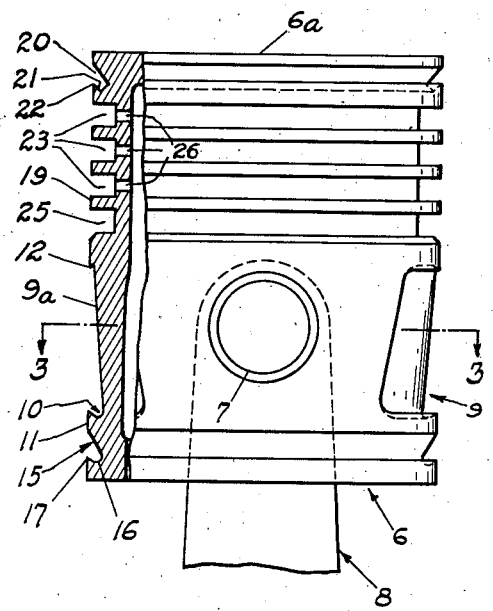
Figure 2:
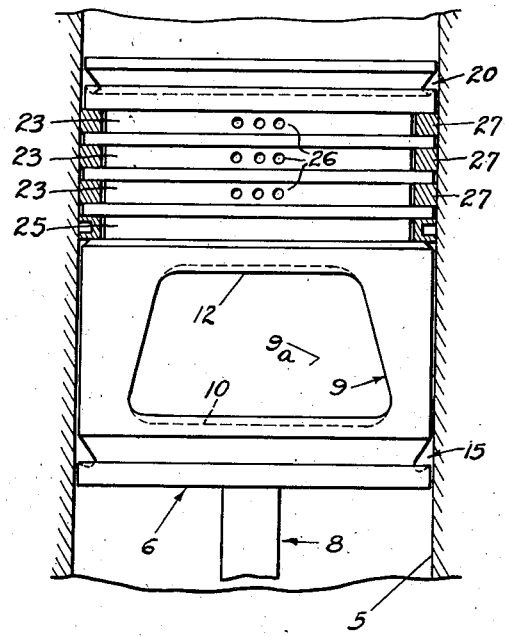
Fig. 2 is a side elevation of the piston, separately shown, the view point being at a right angle to that of Fig. 1 showing it contained within the cylinder of an internal combustion engine, said cylinder being shown in section with parts broken away in order to contract the view. A fragment of the connecting rod is included in this view.
Figure 3:
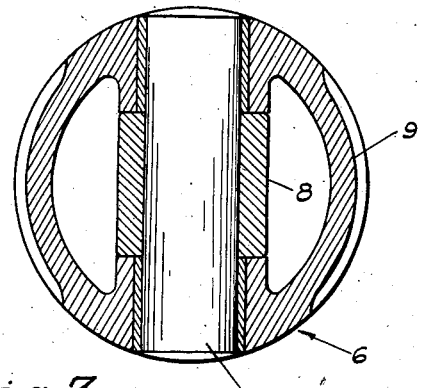
Fig. 3 is a transverse section on line 3—3 of Fig. 1.

Referring in detail to the drawing, therein are shown the piston cylinder 5 of an internal combustion engine and a piston 6 therein, said piston having its interior cavitated in a conventional manner and carrying a piston pin 7 to which is pivotally connected one end portion of the piston rod 8.

In diametrically opposite sides of the piston 6 are formed thrust relief recesses 9, these recesses being located one at each thrust side of the piston and its pin 7 as shown in Fig. 1. Each of these recesses gradually deepens from its upper (as viewed in Fig. 1), side to its opposite side, the deepest portion of the recesses being nearest to the lower or skirt end of the piston. Each of said recesses tapers as to its width the narrow portion of its taper being directed toward the upper end 6a of the piston. Each recess 9 is shown extending a distance around the compression side of the piston and having a circular inner or bottom wall 9a which is curved to the same extent as the side surface of the piston. Each of said recesses 9 has along its lower edge or side a groove or pocket 10 which results from the formation along that part of the recess of an upwardly directed lip 11. Along the upper side of the recess 9 the wall thereof is more steeply inclined thereby forming a downwardly directed shoulder 12 of a beveled character which tends to roll or force the oil outwardly from the recess at each inward movement of the piston.

Adjacent to the lower or skirt end of the piston a groove 15 extends therearound which may be termed an oil elevator groove because, during the operation of the piston, it tends to lift the oil upwardly, that is to say the oil is distributed evenly along the piston travel within its cylinder away from the end of the piston from which the piston rod projects. This groove has in its bottom an annular pocket 16 which is produced by providing an upwardly directed lip 17 around the lower portion of the groove. Adjacent to the upper end of the piston there extends therearound a carbon collector groove 20 which is contoured, as viewed in cross section, like the groove 15 which has already been described, having a bottom recess or pocket 21 surrounded by an outwardly directed lip 22.

Between the groove 20 and the relief recess 9 the piston is surrounded by a series of compression ring grooves 23, and between said grooves 23 and said relief recesses 9 intervenes the oil ring groove 25.

In the operation of the device the fact that the mouth of the oil elevator groove 15 is directed outwardly and is beveled as shown above its deepest portion, facilitates the feeding of the oil from the oil pan formed by the groove into the larger recesses 9 during piston down-strokes. Said larger recesses, in turn, at each downward stroke of the piston, by virtue of their inclined bottoms 9a, roll or force the oil outwardly, spreading it over the surfaces most in need of lubrication. Also the oil when thus controlled and directed aids in maintaining the piston in axial alinement within the cylinder wherein it operates.

In the operation of the device the plentiful circulation of oil continuously provided over the thrust sides of the piston will produce a rolling effect and not a drag. The piston will directly contact with the cylinder walls only when at rest or until the motor is started and the oil circulation is in operation.

In the present invention it has been found that the "ping" caused by the piston rocking or slipping within its cylinder, noticed mostly in automobile motors, will be eliminated to a minimum. Oil consumption has been reduced to a minimum at all times as the piston rings do not have to guide the piston travel any more, all they have to do is to check the oil and compression, as the oil depressions in the piston will guide the piston. Easier starting will be caused by the draining of all oil through the vacuum release holes in the ring grooves, when the engine is in a stopped position. The oil cannot congeal behind the rings in cold temperatures when the engine is stopped. With the oil circulation between the cylinder walls and pistons, "freezing" or scoring of pistons or bores will be eliminated, by providing an oil film to completely separate the piston and cylinder wall when the engine is in operation, thus reducing friction and piston drag to a minimum, and to reduce the carbon from collecting behind the piston rings.

The successful operation of the device appears to be due in part, at least, to the spacious character of the recesses 9 both as to length and breadth. Each recess, as viewed from the side of the piston which it occupies, is seen to have a length extending more than half way across the width of the piston, and to have a breadth which is more than half its length.

All compression ring grooves 23 are also provided with vacuum relief holes 26 which lead into the inner chamber of the piston, and thence to the crank case chamber of the engine, not shown. An oil drain is also provided through the holes 26, to crank case, when the engine is not in operation, thus, after the engine is not running, and the oil being warm, all oil accumulated behind the rings 26 will drain back into the crank case and thereby provide free movement of the pistons in their cylinders, thus providing easier starting after the engine cylinders become cold. Better circulation of air and oil between the grooves 23 and the crank case of the engine will also reduce carbon accumulation behind the compression rings 27, and a balanced air pressure is provided by air passing through said holes 26 between the grooves 23 and the inner chamber of the piston 6.

I claim:

1. A piston having a piston rod connected to it, said rod projecting from one end of said piston, said piston having in at least one of its faces a thrust relief recess, said recess gradually deepening from one side to its opposite side, the deepest portion of said recess being nearest to that end of the piston from which said rod projects.

2. The subject matter of claim 1, and said recess tapering as to its width from the side thereof which is deepest toward its opposite side.

3. A piston having a piston rod connected to it, said rod projecting from one end of said piston, said piston having in at least one of its faces a recess, said recess tapering as to its width, the narrow portion of its taper being directed away from the side of the piston from which said rod projects.

4. In a piston for an internal combustion engine, a carbon collecting groove around that end portion of the piston which is directed toward the combustion chamber, said groove being deeper along one side than the other and being encircled along said deepest side with a carbon retaining lip which is directed toward the aforementioned end of the piston.

5. An internal combustion engine, a set of pistons in said engine having inner chambers leading to the inner chamber of said engine, compression ring grooves around said pistons, and fluid passage means passing between the compression ring grooves and the inner portions of the pistons, and thrust relief oil cavity means formed in the thrust sides of said pistons.

6. An internal combustion engine, a set of pistons in said engine having inner chambers leading to the inner chamber of said engine, thrust relief oil cavity means formed in the thrust sides of said pistons and oil control lips positioned along the edges of said thrust relief oil cavity means.

7. An internal combustion engine, a set of pistons in said engine having inner chambers leading to the inner chamber of said engine, oil cushion cavities formed in the thrust sides of said pistons and oil elevator grooves spaced between said oil cushion cavities and the lower ends of said pistons.

8. A piston of the character referred to having formed in its opposite surface faces two independent depressed areas forming oil holding recesses completely surrounded by marginal shoulders and forming an oil film abutment means carried by said piston surface, the lower portion of said areas being deeper and tapering to less depth toward the upper portions thereof.

9. A piston of the character referred to having formed in its opposite surface faces depresed areas forming oil holding recesses completely surrounded by marginal shoulders and forming oil film abutment means carried by said piston surface, said recesses gradually deepening from one side to the opposite side thereof.

10. A piston for internal combustion engines having piston pin and piston rod connected therewith and which piston has formed in its surface faces, at opposite sides of the axis of said piston pin, depressed areas forming oil holding recesses surrounded by marginal shoulders to form oil abutment means between the piston surfaces and the wall of a cylinder into which said piston is inserted.

11. A cylindrical piston for an internal combustion engine, having a thrust relief recess in at least one of its sides, said recess having an inner bottom surface which is convexed to substantially the same extent as the side surface of the piston, said recess as to its length extending more than half way across the width of the piston as observed from the side of the piston which it occupies, the width of said recess being more than half its length, said recess gradually deepening from one side to its opposite side, that end of the piston which is nearest to the deepest part of said recess being connectible to a piston rod.

12. A piston for internal combustion engines having at its opposite sides, continuous areas, each bounded by a marginal continuous shoulder and forming a shallow oil-containing area in which a film of oil is confined as a cushioning area between the piston on opposite sides and the cylinder wall, substantially as shown.

WALTER OSBORNE.